United States Patent [19]

F'Geppert

[11] 4,295,750

[45] Oct. 20, 1981

[54] SHAFT-COMPONENT CONNECTION MEANS

[75] Inventor: Erwin F'Geppert, Oakland, Mich.

[73] Assignee: The United States of America as represented by the Secretary of the Army, Washington, D.C.

[21] Appl. No.: 152,920

[22] Filed: May 23, 1980

[51] Int. Cl.³ ............................................. B25G 3/00
[52] U.S. Cl. .................................... 403/259; 403/360
[58] Field of Search ............. 403/259, 260, 261, 350, 403/374, 409, 351, 258, 360, 326, DIG. 7

[56] References Cited

U.S. PATENT DOCUMENTS

| 2,026,454 | 12/1935 | Benzing | 403/261 X |
| 2,441,976 | 5/1948 | Rooney | 403/259 X |
| 2,805,105 | 9/1957 | Brasher | 403/258 |
| 3,276,021 | 9/1966 | Horndasch | 403/259 X |
| 3,535,977 | 10/1970 | Baumgarten | 403/326 X |

FOREIGN PATENT DOCUMENTS 1197288  7/1965  Fed. Rep. of Germany ...... 403/259

*Primary Examiner*—Andrew V. Kundrat
*Attorney, Agent, or Firm*—Peter A. Taucher; John E. McRae; Nathan Edelberg

[57] ABSTRACT

A connection between a shaft and a component such as a gear, fan impeller, crank arm, etc, wherein the shaft is provided with axially spaced abutments to sandwich the component against axial displacement along the shaft surface. At least one of the shaft abutments is acutely angled to the shaft axis so that the abutments cooperatively form a wedge-containment system; the component material between the spaced abutments is wedged against rotation around the shaft.

5 Claims, 6 Drawing Figures

SHAFT-COMPONENT CONNECTION MEANS

The invention described herein may be manufactured, used, and licensed by or for the Government for governmental purposes without payment to me of any royalty thereon.

BACKGROUND AND SUMMARY OF THE INVENTION

This invention relates to improved low cost means for mechanically securing a shaft to a component so that the shaft and component are prevented from relative movement in the rotational and axial directions. The connection means is designed for employment either at the end of a shaft or at an intermediate point along the shaft length. Certain embodiments of the invention are designed to minimize shaft machining operations and resultant reduction in shaft cross section or shaft strength. The primary concept of the invention is to provide the mechanical component with at least one external planar face that is acutely angled to the axis of a circular bore extending through the component; the shaft extends through the circular bore and has an abutment means thereon in facial engagement with the acutely angled planar face to prevent relative rotational movement between the mechanical component and the shaft. The invention is usable in various different situations in which it is desired to fixedly mount a component on a rotary shaft, as for example in centrifugal pumps, fans, motors, crank arms or handles.

THE DRAWINGS

Each of the illustrated embodiments includes a shaft having spaced peripheral abutments thereon that trap the mounted component against axial motion along the shaft. At least one of the peripheral abutments is acutely angled to the shaft axis to form a wedge system for preventing relative rotation between the shaft and mounted component.

Figure 2:
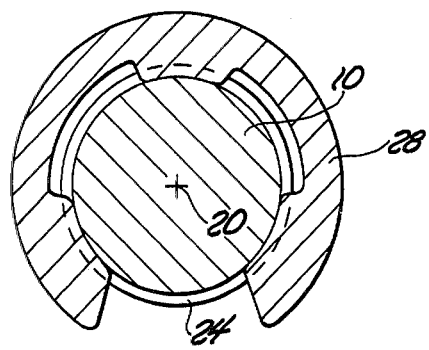
FIG. 2 is a sectional view on line 2—2 and FIG. 1.
Figure 1:
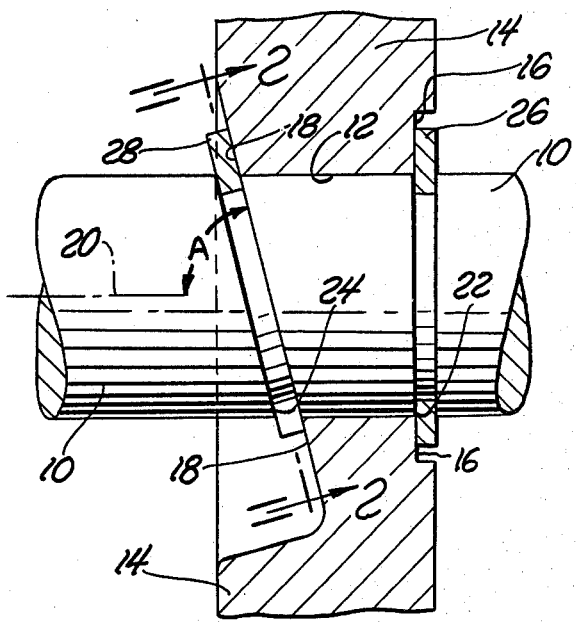
FIG. 1 is a sectional view taken through one embodiment of the invention.

FIGS. 1 and 2 shown an assembly comprising a circular shaft 10 extending through a circular bore 12 in a mechanical component 14. Component 14 may be a pump impeller, gear, crank arm or similar component that is required to be affixed to the shaft. Component 14 is formed with two flat planar faces 16 and 18; face 16 extends normal to the axis 20 of bore 12, and face 18 extends at an acute angle A to the bore 12 axis. Shaft 10 is provided with two peripheral grooves 22 and 24 for reception of snap rings 26 and 28. Under my invention, groove 24 has the same acute angle as the aforementioned planar face 18, so that snap ring 28 abuts against face 18 to prevent axial dislocation of shaft 10 out bore 12 in a rightward direction. Snap ring 26 prevents axial dislocation of the shaft in a leftward direction. A principal feature of my invention is the acute angulation A of surface 18 and snap ring 28 that prevents relative rotation between component 14 and shaft 10. The wall areas of component 14 between snap rings 26 and 28 are wedged in place, such that rotation of component 14 is impossible; rings 26 and 28 constitute abutments. Wedge action is accomplished with a relatively small included angle between the planes of snap ring 26 and 28. In a representative arrangement angle A would be approximately eighty-five degrees, making the wedge angle about five degrees.

Figure 3:
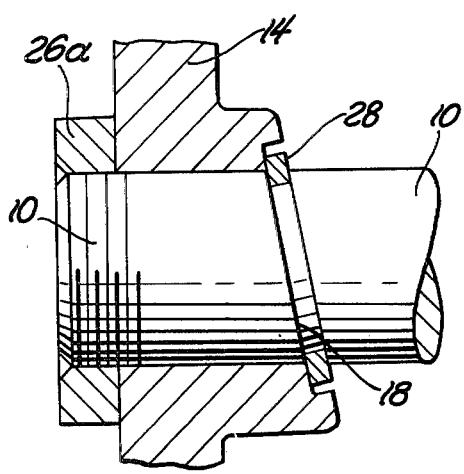
FIGS. 3 through 6 are sectional views taken through other embodiments of the invention.

FIG. 3 illustrates a second embodiment of the invention wherein snap ring 26 is replaced by a conventional nut 26a. The annular wall area of component 14 between abutment snap ring 28 and abutment nut 26a is wedged into a fixed nonrotary attitude on shaft 10.

Figure 4:
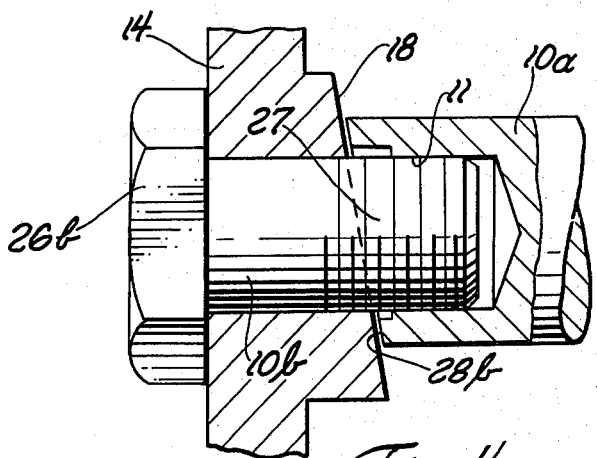

FIG. 4 illustrates an embodiment of the invention wherein the shaft is comprised of two threaded shaft sections 10a and 10b. Section 10a is formed with a threaded opening 11 in its acutely angled end face 28b. Shaft section 10b includes an enlarged noncircular head 26b and a circular threaded area 27 meshed with the internal threads in shaft section 10a. The acute angle of shaft surface 28b corresponds to the angulation of face 18 on component 14, whereby the component is wedged between the abutments defined by head 26b and surface 28b. In practice shaft section 10b may consist of a conventional standard bolt. The embodiments of FIGS. 3 and 4 are intended for use primarily where component 14 is required to be affixed to the end shaft 10; the FIG. 1 embodiment is useful when the component is required to be installed at an intermediate point along the shaft length.

Figure 5:
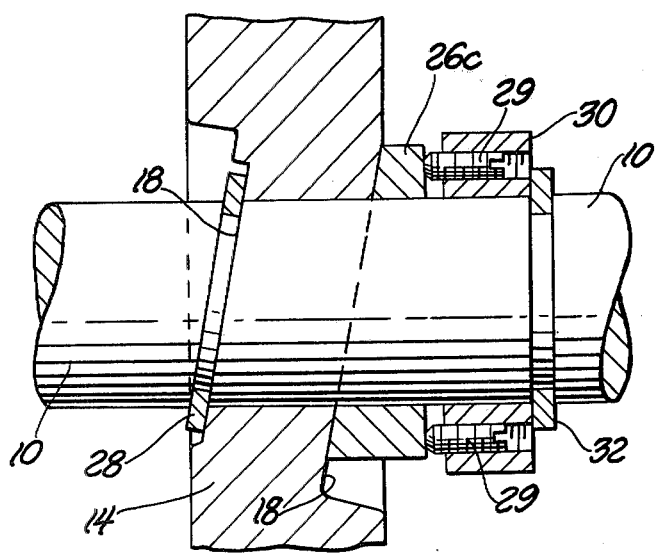

FIG. 5 illustrates a further embodiment of the invention wherein the shaft abutments are both acutely angled to the shaft axis. In this case abutment 26c consists of a collar biased leftwardly by set screws 29 carried in an annular thrust-absorption member 30; a snap ring 32 prevents rightward displacement of member 30 in reaction to the thrust forces produced by set screws 29. The action of the FIG. 5 embodiment is generally similar to that of the previously-described embodiments except that rotational thrust forces of component 14 are carried by both abutment elements 26c and 28, thereby increasing the thrust load capability of the assembly.

Figure 6:
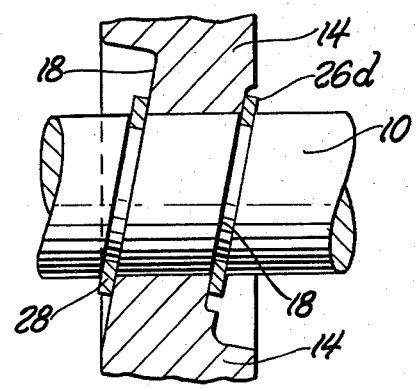

FIG. 6 illustrates a system that is similar to the FIG. 1 embodiment except that snap ring 26d is acutely angled to the shaft axis. The FIG. 6 embodiment has enhanced thrust-absorption characteristics similar to the FIG. 5 embodiment.

The general concept, as embodied in the various mechanisms shown in the drawings, involves the formation of at least one acutely angled planar face 18 on component 14 and two spaced abutment means 26 and 28 on shaft 10, at least one of the abutment means being angled to the shaft 10 axis at the same angle as the angulation of face 18, to resist tendency of component 14 to rotate on shaft 10.

The invention embodiments of FIGS. 1, 5 and 6 are considered to be advances over conventional key-keyway arrangements for preventing rotation of component 14 on shaft 10, in that the antirotation elements 26 and 28 also serve to locate component 14 and prevent axial movement thereof along the shaft. It is also believed that use of my invention would result in relatively slight loss of shaft strength compared to results obtained using conventional Woodruff keyway arrangements. Conventional keyways are relatively deep in the radial direction and long in the axial direction, with consequently great reduction in shaft strength; my peripheral slots 22 and 24 can be relatively shallow, with correspondingly slight reduction in shaft strength.

I wish it to be understood that I do not desire to be limited to the exact details of construction shown and described for obvious modifications will occur to a person skilled in the art.

I claim:

1. In an assembly comprising a circular shaft, a mechanical component having two external planar faces and a circular bore extending therebetween, said shaft extending through the bore as a non-wobble fit therein: the improvement wherein at least one of the aforementioned external planar faces is acutely angled to the bore axis; first abutment means carried by the shaft in facial engagement with the acutely angled planar face on the mechanical component; and second abutment means carried by the shaft in facial engagement with the other planar face on the mechanical component; the angle taken by the acutely angled planar face being sufficient to prevent relative rotation between the shaft and the mechanical component; said first abutment means being a snap ring seated in a peripheral groove in the shaft so that a side surface of the ring engages the acutely angled planar face on the mechanical component.

2. The improvement of claim 1: said second abutment means comprising an internally threaded nut having meshed engagement with a threaded area on the shaft so that an end face of the nut abuts against the other planar face on the mechanical component.

3. The improvement of claim 1: said second abutment means being a second snap ring seated in a second peripheral groove in the shaft; said second snap ring extending normal to the shaft axis so that one of its side surfaces engages the other planar face on the mechanical component.

4. The improvement of claim 1: said second abutment means being a second snap ring seated in a second peripheral groove in the shaft so that a side surface of the second ring engages the other planar face on the mechanical component.

5. The improvement of claim 4: said other planar face of the mechanical component being acutely angled to the bore axis; said second snap ring and its mounting groove being angled to the shaft axis at the same angle as said other planar face on the mechanical component; the spacing between the snap rings being the same as the spacing between the planar faces on the mechanical component.

* * * * *